(12) United States Patent
Barron et al.

(10) Patent No.: US 8,943,895 B2
(45) Date of Patent: Feb. 3, 2015

(54) CAPACITIVE PRESSURE SENSOR

(75) Inventors: Leo E. Barron, Franklin, MA (US); John A. Czazasty, Norton, MA (US)

(73) Assignee: Dynisco Instruments LLC, Franklin, MA (US)

( * ) Notice: Subject to any disclaimer, the term of this patent is extended or adjusted under 35 U.S.C. 154(b) by 277 days.

(21) Appl. No.: 13/607,602

(22) Filed: Sep. 7, 2012

(65) Prior Publication Data
US 2014/0069199 A1    Mar. 13, 2014

(51) Int. Cl.
*G01L 9/12* (2006.01)

(52) U.S. Cl.
USPC .............................. 73/718; 73/724

(58) Field of Classification Search
USPC .................................. 73/700–756
See application file for complete search history.

(56) References Cited

U.S. PATENT DOCUMENTS

| | | |
|---|---|---|
| 3,869,676 A | 3/1975 | Harrison et al. |
| 3,883,812 A | 5/1975 | Harrison et al. |
| 4,093,915 A | 6/1978 | Briefer |
| 4,227,419 A | 10/1980 | Park |
| 4,332,775 A | 6/1982 | Genequand et al. |
| 4,442,125 A | 4/1984 | Thiele |
| 4,442,335 A | 4/1984 | Rossi |
| 4,780,705 A | 10/1988 | Beane |
| 4,795,967 A | 1/1989 | Fredericks |
| 4,963,729 A | 10/1990 | Spillman et al. |
| 5,101,165 A | 3/1992 | Rickards |
| 5,103,672 A | 4/1992 | Terry, Jr. et al. |
| 5,165,281 A | 11/1992 | Bell |
| 5,166,626 A | 11/1992 | Hester et al. |
| 5,186,054 A | 2/1993 | Sekimura |
| 5,224,383 A | 7/1993 | Pinto et al. |
| 5,277,068 A | 1/1994 | Fukiura et al. |
| 5,349,492 A | 9/1994 | Kimura et al. |
| 5,359,941 A | 11/1994 | DeLorean |

(Continued)

FOREIGN PATENT DOCUMENTS

| | | |
|---|---|---|
| EP | 2113760 | 4/2008 |
| EP | 2075563 | 12/2008 |
| WO | WO 92/22794 A1 | 12/1992 |

OTHER PUBLICATIONS

Efi Ed Fagan Inc. "Controlled Expansion Alloys Electrical/Electronic Nickel" The Materials You Need, When You Need Them www.edfagan.com (4 pages).

*Primary Examiner* — Andre Allen
(74) *Attorney, Agent, or Firm* — Wolf, Greenfield & Sacks, P.C.

(57) ABSTRACT

Pressure sensors and their methods of use are described. In one embodiment, a pressure sensor includes a pressure deflectable diaphragm end formed of a first material with a first coefficient of thermal expansion, and a relatively non-deformable component formed of a second material having a second coefficient of thermal expansion. The pressure deflectable diaphragm end and the non-deformable component form a first and a second portion of a capacitor. An intermediate component separates, or is disposed between, the pressure deflectable diaphragm end and the relatively non-deformable component. The intermediate component is formed of a material with a coefficient of thermal expansion that is less than the first coefficient of thermal expansion which may help minimize changes in span with temperature. In other embodiments, a pressure sensor includes an intermediate circuit located between a distal end of the pressure sensor and a remotely located circuit enclosure including a main circuit.

36 Claims, 11 Drawing Sheets

(56) References Cited

U.S. PATENT DOCUMENTS

| | | |
|---|---|---|
| 5,369,989 A | 12/1994 | Gates, Jr. et al. |
| 5,400,489 A | 3/1995 | Hegner et al. |
| 5,424,650 A | 6/1995 | Frick |
| 5,445,031 A | 8/1995 | Benzel |
| 5,479,827 A | 1/1996 | Kimura et al. |
| 5,492,016 A | 2/1996 | Pinto et al. |
| 5,535,629 A | 7/1996 | Gerdes et al. |
| 5,553,502 A | 9/1996 | Hsieh |
| 5,604,685 A | 2/1997 | Seeskink et al. |
| 5,656,780 A | 8/1997 | Park |
| 5,669,263 A | 9/1997 | Borchers et al. |
| 5,792,957 A | 8/1998 | Lüder et al. |
| 5,892,365 A | 4/1999 | Bailleul et al. |
| 5,920,015 A | 7/1999 | Hallberg et al. |
| 5,969,258 A | 10/1999 | Gerst et al. |
| 5,973,502 A | 10/1999 | Bailleul et al. |
| 6,122,976 A | 9/2000 | Hallberg et al. |
| 6,148,674 A | 11/2000 | Park et al. |
| 6,151,967 A | 11/2000 | McIntosh et al. |
| 6,252,759 B1 | 6/2001 | Lange et al. |
| 6,267,009 B1 | 7/2001 | Drewes et al. |
| 6,374,680 B1 | 4/2002 | Drewes et al. |
| 6,450,038 B1 | 9/2002 | Iseni et al. |
| 6,450,039 B1 | 9/2002 | Masuda |
| 6,505,516 B1 | 1/2003 | Frick et al. |
| 6,516,762 B1 | 2/2003 | Kinugawa et al. |
| 6,536,287 B2 | 3/2003 | Beekhuizen et al. |
| 6,536,288 B2 | 3/2003 | Scholz et al. |
| 6,563,328 B1 | 5/2003 | Lenormand et al. |
| 6,595,064 B2 | 7/2003 | Drewes et al. |
| 6,615,665 B1 | 9/2003 | Flögel et al. |
| 6,718,827 B1 | 4/2004 | Lee et al. |
| 6,776,046 B2 | 8/2004 | Pistorius |
| 6,940,292 B2 | 9/2005 | Lalla |
| 6,941,814 B2 | 9/2005 | Hegner et al. |
| 7,059,195 B1 | 6/2006 | Liu et al. |
| 7,150,197 B2 | 12/2006 | Hegner et al. |
| 7,162,927 B1 | 1/2007 | Selvan et al. |
| 7,197,937 B2 | 4/2007 | Amore et al. |
| 7,216,048 B2 | 5/2007 | Wang et al. |
| 7,236,113 B1 | 6/2007 | Wang |
| 7,249,515 B2 | 7/2007 | Hegner et al. |
| 7,260,994 B2 | 8/2007 | Oboodi et al. |
| 7,290,454 B2 | 11/2007 | Liu |
| 7,503,220 B2 | 3/2009 | Sittler et al. |
| 7,591,184 B2 | 9/2009 | Broden |
| 7,658,096 B2 | 2/2010 | Pinto et al. |
| 7,765,875 B2 | 8/2010 | Guo |
| 7,963,164 B2 | 6/2011 | Ross, Jr. et al. |
| 8,278,937 B2 | 10/2012 | Vasilyev et al. |
| 8,800,301 B2 | 8/2014 | Goberna Selma et al. |
| 2007/0013014 A1 | 1/2007 | Guo et al. |
| 2009/0301190 A1 | 12/2009 | Ross, Jr. et al. |
| 2010/0000326 A1 | 1/2010 | Guo |
| 2010/0199778 A1 | 8/2010 | Hegner et al. |
| 2012/0132006 A1 | 5/2012 | Roziere |
| 2014/0069197 A1* | 3/2014 | Barron et al. .............. 73/708 |
| 2014/0069198 A1* | 3/2014 | Barron et al. .............. 73/724 |

* cited by examiner

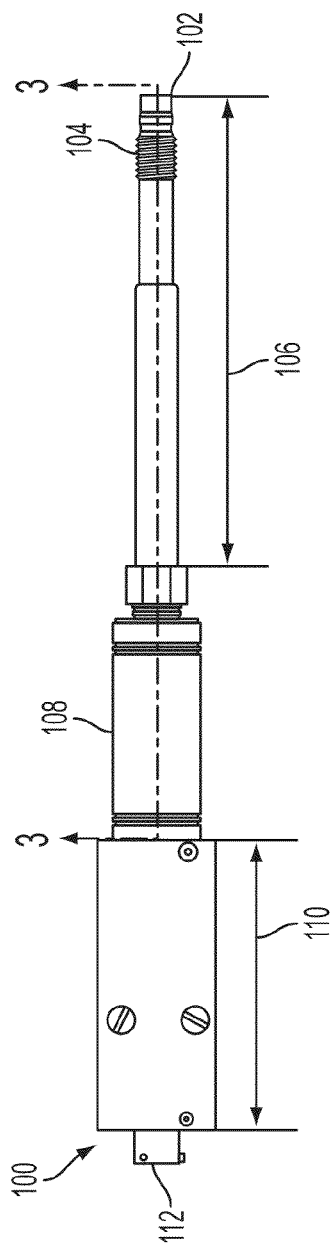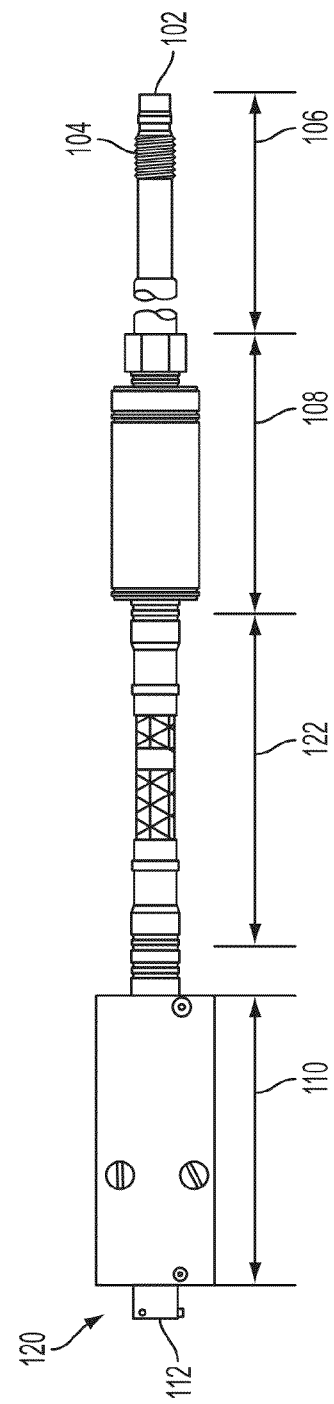
FIG. 1
FIG. 2

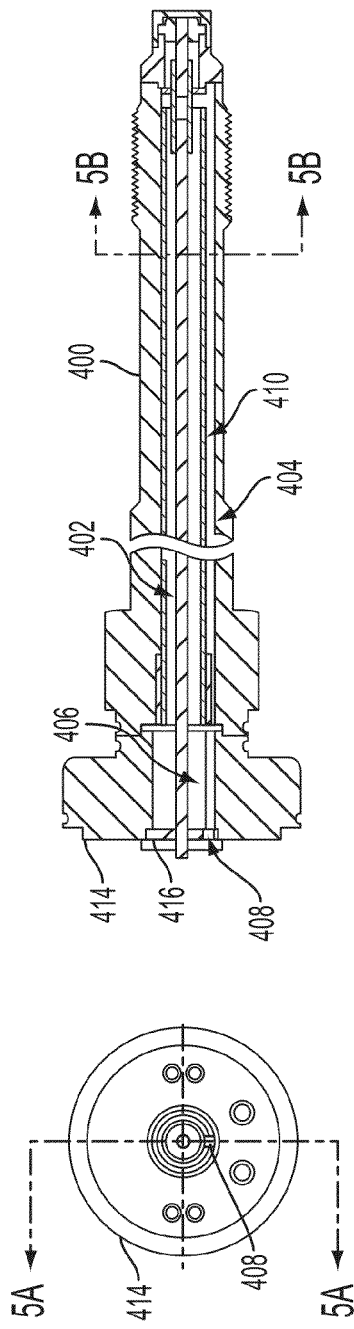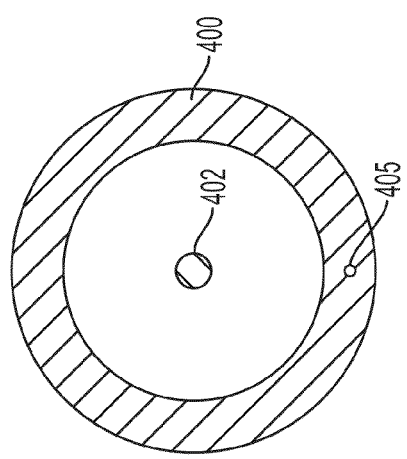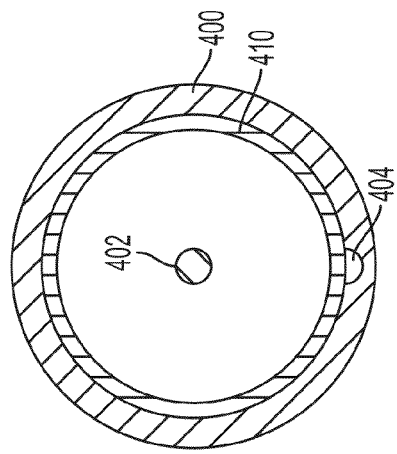

CAPACITIVE PRESSURE SENSOR

FIELD

The disclosed embodiments are generally directed to capacitive-based pressure sensors.

BACKGROUND

Extrusion and injection molding of plastics is extensively used in the production of components for numerous industries and applications. During the manufacturing of these various components, it is important to measure the pressure and temperature of the melt within the system to ensure accurate and reproducible component production. If the melt pressure is too low, insufficient mold packing, short shots, and other undesirable manufacturing defects may occur. Further, if the mold pressure is too high, it may result in excessive flash, material ejection, and possible equipment malfunction. Thus, pressure sensors are generally incorporated into one or more locations within an extruder, or injection molding system, to monitor the extrusion, or injection, process. However, polymer melt temperatures range up to 400° C., or more, depending upon the particular polymer. Therefore, pressure sensors appropriate for use in high temperature environments are typically used for monitoring these systems. In addition, high temperature pressure sensors are also used in various other applications including, but not limited to, pressure monitoring of turbine engines, oil drilling, food processing operations, and other appropriate applications.

SUMMARY

In one embodiment, a pressure sensor includes a probe body comprising a pressure deflectable diaphragm end formed of a first material having a first coefficient of thermal expansion. The diaphragm end includes a first surface at least partially defining a first portion of a capacitor. The pressure sensor also includes a relatively non-deformable component formed of a second material having a second coefficient of thermal expansion. The relatively non-deformable component includes a second surface spaced from the first surface. The second surface also at least partially defines a second portion of the capacitor. An intermediate component is disposed at a peripheral region isolating the pressure deflectable diaphragm end and the relatively non-deformable component from each other. The intermediate component is formed of a third material having a third coefficient of thermal expansion. The third coefficient of thermal expansion is less than the first coefficient of thermal expansion.

In another embodiment, a pressure sensor includes a probe body and a pressure deflectable diaphragm end formed of a conductive material and coupled to the probe body. The conductive material has a first coefficient of thermal expansion. Further, the pressure deflectable diaphragm end has a first surface defining at least a first portion of a capacitor. The pressure sensor also includes an alumina disk with a second coefficient of thermal expansion that is less than the first coefficient of thermal expansion. The disk includes a metallization layer. The metallization layer is spaced from the first surface such that the metallization layer at least partially defines a second portion of the capacitor. A spring is disposed between the probe body and the alumina disc. The spring biases the alumina disk toward the pressure deflectable diaphragm end. An annular shim component is disposed at a peripheral region of the alumina disk to isolate the alumina disk from the pressure deflectable diaphragm end. The annular shim is formed of a third material with a third coefficient of thermal expansion. The third coefficient of thermal expansion is less than the first coefficient of thermal expansion.

In yet another embodiment, a pressure sensor includes an intermediate circuit that produces an electrical voltage signal proportional to a difference between a reference capacitance and a sensed capacitance.

In another embodiment, a pressure sensor comprises a probe assembly including: a relatively rigid body; a distal end having a capacitive pressure sensor, the capacitive pressure sensor capable of producing a sensed capacitance as a result of pressure acting on the capacitive pressure sensor; and a proximal end opposite the distal end. An intermediate circuit enclosure is disposed at the distal end. A capacitive detection bridge circuit is housed within the intermediate circuit enclosure. The capacitive detection bridge circuit produces an electrical voltage signal proportional to a difference between a reference capacitance and the sensed capacitive signal. The pressure sensor also includes a remote circuit enclosure. A relatively flexible interconnect couples the remote circuit enclosure to the intermediate circuit enclosure. A main circuit is disposed in the remote circuit enclosure. The remote circuit enclosure is connected to the intermediate circuit enclosure by the relatively flexible interconnect. The capacitive detection bridge circuit transmits the electrical voltage signal to the main electrical circuit through the interconnect.

In one embodiment, a pressure sensor includes a probe body and a capacitive sensor disposed at a distal end of the probe body. The capacitive sensor produces a sensing capacitance. The pressure sensor further includes a shunt capacitance, wherein a change in the sensing capacitance resulting from a change in temperature is offset by a corresponding change in the shunt capacitance.

In another embodiment, a method of making a pressure sensor includes: arranging a pressure deflectable diaphragm cap having a first capacitive surface on a probe body; electrically coupling the first capacitive surface to the probe body; selecting a material having a desired dielectric constant and forming a non-deformable component from the material; forming a second capacitive surface on a portion of the non-deformable component; connecting a lead to the second capacitive surface and positioning the non-deformable component within the probe body wherein a shunt capacitance is defined between the lead and the probe body; and arranging the non-deformable component relative to the pressure deflectable diaphragm cap by spacing the second capacitive surface away from the first capacitive surface such that the first and second surfaces define a capacitive sensor having a sensing capacitance, wherein a change in the sensing capacitance resulting from a change in temperature is offset by a corresponding change in the shunt capacitance.

In one embodiment, a pressure sensor includes a tubular probe body having a proximal end and a distal end. The pressure sensor also includes a capacitive sensor disposed at the distal end of the probe body. A lead is electrically coupled to the capacitive sensor and extends along an interior space of the tubular probe body toward the proximal end. At least one support is formed of a material having a relatively low dielectric constant and disposed within the tubular probe body. The at least one support is constructed and arranged to support the lead within the tubular probe body and space the lead away from an inner wall of the tubular probe body.

In another embodiment, a pressure sensor includes a tubular probe body having a proximal end and a distal end. The tubular probe body includes a channel formed in a wall of the tubular probe body and extending from the distal end to the proximal end. A capacitive sensor is disposed at the distal end of the probe body. A lead is electrically coupled to the capacitive sensor and extends along an interior space of the tubular probe body toward the proximal end. A temperature sensor is disposed at the distal end of the tubular probe body, and a temperature sensor lead is disposed in the channel and connected to the temperature sensor.

It should be appreciated that the foregoing concepts, and additional concepts discussed below, may be arranged in any suitable combination, as the present disclosure is not limited in this respect.

The foregoing and other aspects, embodiments, and features of the present teachings can be more fully understood from the following description in conjunction with the accompanying drawings.

BRIEF DESCRIPTION OF DRAWINGS

The accompanying drawings are not intended to be drawn to scale. For purposes of clarity, not every component may be labeled in every drawing. In the drawings:

FIG. 1 is a schematic representation of a pressure sensor incorporating an intermediate circuit;

FIG. 2 is a schematic representation of a pressure sensor incorporating an intermediate circuit and flexible interconnect;

FIG. 5 is a schematic end view of a pressure sensor including a temperature sensor lead channel;

FIG. 5A is a cross-sectional view of the pressure sensor depicted in FIG. 5;

FIG. 5B is a cross-sectional view of the pressure sensor depicted in FIG. 5A including a temperature sensor lead groove;

FIG. 5C is a cross-sectional view of a pressure sensor including a temperature sensor lead bore;

DETAILED DESCRIPTION

Figure 3:
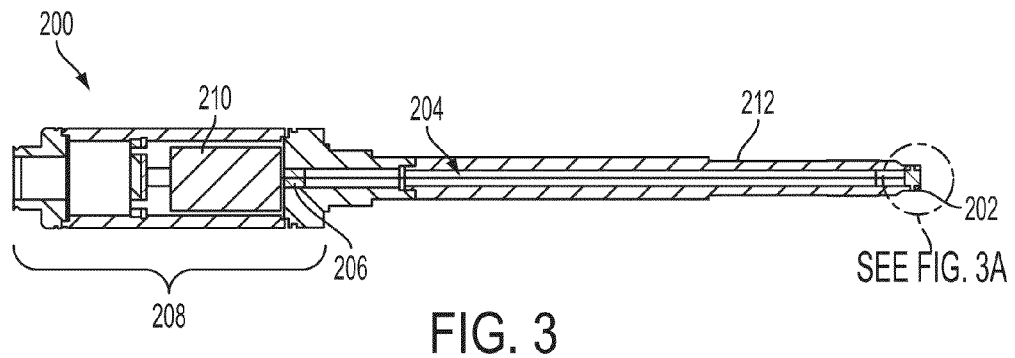
FIG. 3 is a schematic cross-sectional view of the pressure sensor taken along line 3-3 of FIG. 1 of an intermediate circuit.

Pressure sensors for monitoring the pressures associated with a polymer melt during extrusion and injection molding processes are subjected to elevated temperatures ranging up to 400° C., or more, depending upon the particular polymer. The inventors have recognized that exposure to these large temperature ranges not only requires correction of the output temperature signal due to high temperature effects, but these temperatures also have a detrimental effect on component life. Therefore, the inventors have recognized a need to provide a high temperature pressure sensor probe capable of accurately measuring the pressure while also providing increased reliability and lifetime. Further, in order to provide higher fidelity signals with greater sensitivity, the inventors have also recognized the need to reduce overall signal losses and sources of interference within the pressure sensor. Additionally, the inventors have recognized a need to optimize the change in capacitance due to pressure while minimizing and controlling the overall capacitance of the pressure sensor.

The inventors have recognized that the lead between the capacitive pressure sensor and proximately located main circuit is subject to stray capacitances which interfere with the sensed pressure signal. Further, the signal is subject to greater disturbances from these stray capacitances prior to conversion to a DC signal from the as measured AC capacitance signal. Therefore, it is desirable to transform the capacitive pressure signal into a DC signal as close to the capacitive pressure sensor as possible. However, the location of the circuitry is limited due to the high temperatures present at the distal end of the probe body during use. The inventors have recognized that by providing an intermediate circuit capable of continuously operating at higher temperatures, it can be used to transform the pressure sensor signal from an AC to DC signal at a point closer to the distally located pressure sensor, so that the output pressure sensor signal is less susceptible to the influence of stray capacitances, resulting in a higher signal fidelity, with the pressure sensor being capable of continuous high temperature operation.

The inventors have also recognized that components of the distally located capacitive pressure sensor are subjected to thermally induced stresses at elevated operating temperatures due to mismatches between the coefficients of thermal expansion of the various components. These thermally induced stresses are of particular concern when they are induced in brittle components such as ceramic components. As such, an intermediate component, and/or coating, is provided between the components of the pressure sensor that have differing coefficients of thermal expansion to reduce the thermally induced stresses and prevent fatigue and/or cracking of the components. One way in which the intermediate components, and/or coatings, reduce the thermally induced stresses between the components is to use a material having a coefficient of thermal expansion that is less than that of the material with the higher coefficient of thermal expansion. Since the intermediate component, and/or coating, has an intermediate coefficient of thermal expansion, each component will exhibit a reduced stress due to the more gradual transition between components with different coefficients of thermal expansion. As an alternative, or in addition, to the above, the intermediate component, and/or coating, can include low coefficient of friction materials to reduce the thermally induced stresses transferred between the components due to high friction otherwise generated at their interfaces.

In addition to addressing high temperature operating issues associated with sensing the pressure, the inventors have recognized that it is also desirable to further reduce any stray capacitances within the system to improve the fidelity of the output pressure signal. As such, it is desirable to minimize shunt capacitances between the lead outputting the pressure signal and the various components forming the pressure probe. For example, since the shunt capacitance increases the closer the output lead is to the walls of the probe body, it is desirable to concentrically position the output lead within the probe body and minimize the lateral displacement of the output lead within the probe body that may occur due to lateral vibrations of the lead. In one embodiment, the lead is supported at predefined spacings using a bushing and/or supports made from a material with a low dielectric constant and/or low coefficient of thermal expansion to minimize the static and/or dynamic deflections of the lead relative to the walls of the probe body. In some embodiments, the material has both a low dielectric constant and low coefficient of thermal expansion. Other sources of shunt capacitance include, but are not limited to, the output lead interacting with other components located within the probe body such as the leads of a temperature sensor for monitoring the process temperature. In such an embodiment the shunt capacitance is proportional to the distance between the output lead and the leads of the temperature sensor. Thus, it is desirable to position the leads of sensing components such as the temperature sensor as far from the output lead as possible to reduce the magnitude of the capacitance between those components. In one embodiment, the leads of the temperature sensor, or other component, are located in a channel or groove formed within the walls of the probe body itself to distance that component from the output lead and improve the fidelity of the output signal.

While it is possible to reduce the interference induced in the output pressure signal by components due to stray capacitances (from, for example, a temperature sensor) within the system, the inventors have recognized that in some embodiments the interference induced by a temperature sensor can be avoided by eliminating the need for that temperature sensor altogether. However, temperature sensors are generally used to help compensate for changes in the zero output and span of the pressure signal due to temperature variations. Consequently, the inventors have recognized that it would be beneficial to provide a pressure sensor that is capable of intrinsically compensating for one, or both, of the changes in the zero output and span of the pressure signal as a result of temperature variations. The thermally induced changes (e.g. decrease) in the zero output can be compensated for by having a corresponding opposing change (e.g. increase) in the shunt capacitances within the probe. More specifically, by controlling component geometries and selecting materials with specific thermal coefficients of dielectric constant, the rate at which the shunt capacitance changes with temperature can be matched to offset the thermally induced changes in the zero output of pressure sensor. In addition to compensating for the zero output, the change in the span relative to an increase in temperature is also compensated for by controlling the rate at which the gap between the capacitive surfaces of the sensor increases versus temperature. Similar to the above, the rate at which the gap increases versus temperature is determined by controlling the component geometries and selecting materials with specific coefficients of thermal expansion. Therefore, the pressure signal can be compensated for temperature variations without the need for a temperature sensor. Consequently, in embodiments not requiring temperature sensing capabilities (as may be required by an end user or other appropriate use), the temperature sensor can be eliminated from the pressure sensing probe resulting in reduced complexity and additionally reduced stray capacitances within the probe body and a corresponding increase in signal fidelity.

For the sake of clarity, the current disclosure describes a high temperature pressure sensor for use in sensing pressures for a high temperature polymer melt. However, it should be understood that the current disclosure is not limited to use with only high temperature polymer melts. Instead, the high temperature pressure sensor embodiments disclosed herein are capable of being used in any number of different high and low temperature pressure sensing applications.

Turning now to the figures, FIG. 1 depicts an embodiment of a pressure sensor probe assembly 100 arranged to isolate the main circuitry of the assembly from the heat of the melt, or other material, being monitored. Probe assembly 100 includes a probe body having a distal end including a pressure sensor 102. In the present embodiment, pressure sensor 102 is a capacitive pressure sensor incorporating a pressure deflectable diaphragm coupled to a capacitive detection bridge circuit. In some instances the bridge circuit is a diode bridge circuit such as that disclosed in U.S. Pat. Nos. 3,883,812 and 3,869,676, the disclosures of which are incorporated herein by reference in their entireties. The probe assembly 100 is attached to the system being monitored through any appropriate means including a threaded connection 104. Due to space constraints within rigid probe body 106 as well as the high temperatures present at the distal portion of the rigid probe body during operation, aside from the capacitive sensor itself, the sensor electronics are not located within the probe body. Therefore, the signal output from the distally located capacitive pressure sensor is an unamplified AC signal. This unamplified AC signal is easily disturbed due to interference from the relatively large stray capacitances present within the pressure sensor probe. Therefore, it is desirable to either shield or amplify the signal to increase signal fidelity. While it is possible to shield the lead outputting the signal, in some alternative embodiments, an intermediate circuit capable of high temperature operation is located within an intermediate circuit enclosure distanced from the distal end of the probe. In some instances the intermediate circuit enclosure is located at the proximal end of the probe. This intermediate circuit is used to amplify and/or transform the signal prior to transmitting the signal to a remotely located main circuit contained within a main circuit enclosure 110. In some embodiments the majority of the probe circuitry and processing of the signal is conducted within the main circuit. Therefore, in at least some embodiments, the intermediate circuit only includes the minimal amount of circuitry capable of performing the desired operation on the output signal prior to transmitting it to the main circuit for further processing.

In embodiments where the intermediate circuit enclosure is at a temperature greater than the maximum continuous operating temperature of the main circuit, it is desirable to distance the main circuit from the intermediate circuit enclosure. Therefore, in some embodiments, as depicted in FIG. 2, a pressure sensor probe assembly 120 includes an interconnect 122 to distance the main circuit from the intermediate circuit. Interconnect 122 transmits the pressure signal output from the intermediate circuit to the main circuit. In some cases, interconnect 122 is a flexible interconnect such as a flex circuit or cable capable of transmitting the output pressure sensor signal from the intermediate circuit to the remotely located main circuit. Depending upon the designed operating temperature for the intermediate circuit enclosure, the main circuit enclosure can be located at any appropriate distance from the intermediate circuit enclosure to ensure the appropriate continuous operating of the circuitry contained therein without being negatively affected by high temperatures. For example, the distance between the intermediate circuit enclosure and the main circuit enclosure can be at least double, or at least quadruple, a distance between the intermediate circuit enclosure and the distal end of the pressure sensor probe assembly. Alternatively, or in addition to, locating the main circuit remotely, the main circuit enclosure and intermediate circuit enclosures may include active and/or passive cooling to maintain the circuitry contained therein at the appropriate operating temperatures.

As shown in FIG. 3, pressure sensor probe assembly 200 includes capacitive pressure sensor 202 at a distal end thereof. A capacitive detection bridge circuit can be coupled to the pressure sensor to detect the applied pressure and output a corresponding electrical voltage signal related to the applied pressure. The signal from capacitive pressure sensor 202 is output via lead 204 through a rigid probe body 212. As depicted in the figure, rigid probe body 212 is tubular in shape though other shapes are also possible. Lead 204 is supported by bushing 206 captured within the bore of the rigid probe body. In some embodiments, bushing 206 is a thin quartz disk, that is arranged and adapted to support the lead concentrically within the rigid probe body 212. After passing through bushing 206, lead 204 is transmittingly coupled to intermediate circuit 210 located in intermediate circuit enclosure 208. As depicted in the figure, intermediate circuit 210 includes a printed circuit board though any other appropriate construction could be used. As noted above, the pressure sensor signal is output to the intermediate circuit prior to being transmitted to the remotely located main circuit.

In some embodiments, the intermediate circuit is adapted and configured to continuously operate at a temperature greater than the main circuit. Therefore, in such an embodiment, the intermediate circuit enclosure containing the intermediate circuit is advantageously located at a distance from the distal end of the probe assembly that corresponds to the maximum continuous operating temperature of the intermediate circuit. Alternatively, the intermediate circuit enclosure could be located at greater distances corresponding to operating temperatures less than the maximum continuous operating temperature of the intermediate circuit. In one exemplary embodiment, the maximum continuous operating temperature of the intermediate circuit is approximately 150° C. In one embodiment, the intermediate circuit can be continuously operated at temperatures exceeding approximately 125° C. and less than approximately 150° C. While a specific operating temperature range for the intermediate circuit is described the current disclosure is not limited to any particular temperature range. For example, in some embodiments, the circuit is constructed to operate at temperatures less than approximately 250° C. In such an embodiment, the intermediate circuit could be continuously operated at temperatures less than approximately 250° C. or any other appropriate temperature at which the circuit is capable of continuously operating.

Without wishing to be bound by theory, it is noted that the capacitive pressure sensor is remote from the intermediate circuit and the output capacitance signal is susceptible to the stray capacitances present along the signal transmission path until the output capacitance signal is processed by the intermediate circuit. Therefore, in some embodiments, the intermediate circuit advantageously includes a diode bridge circuit to convert the AC capacitance signal to a DC output signal for subsequent transmission to the remotely located main circuit. In other embodiments, the intermediate circuit also includes circuitry to amplify the signal. The remaining electronics such as, for example, the oscillator circuitry, output signal conditioning circuitry, excitation circuitry, and additional circuitry needed to provide the final conditioned signal for outputting to a user (or interface) are located in the main circuit in the remote circuit enclosure.

In some embodiments, the pressure sensor probe and the corresponding intermediate circuit are exposed to a range of operating temperatures. Therefore, in such an embodiment, it is advantageous to provide active temperature compensation for the signal output from the intermediate circuit due to signal errors introduced by operating the intermediate circuit at different temperatures. Therefore, in one embodiment, a temperature sensor is provided to measure a temperature of the intermediate circuit enclosure. The measured temperature is subsequently output to the main circuit for use in correcting the output signal for temperature effects at the intermediate circuit. Alternatively, in some embodiments, circuitry capable of correcting the output signal for temperature effects at the intermediate circuit is included in the intermediate circuit. Depending on the particular embodiment, the intermediate circuit and associated temperature sensor are disposed on a printed circuit board. Alternatively, the intermediate circuit could include a temperature sensing circuit formed therein as the current disclosure is not limited to any particular temperature sensor. Regardless of the specific configuration, in the above embodiments, the pressure sensor monitors the temperature of the intermediate circuit and corrects the output signal for any temperature effects.

Figure 3A:
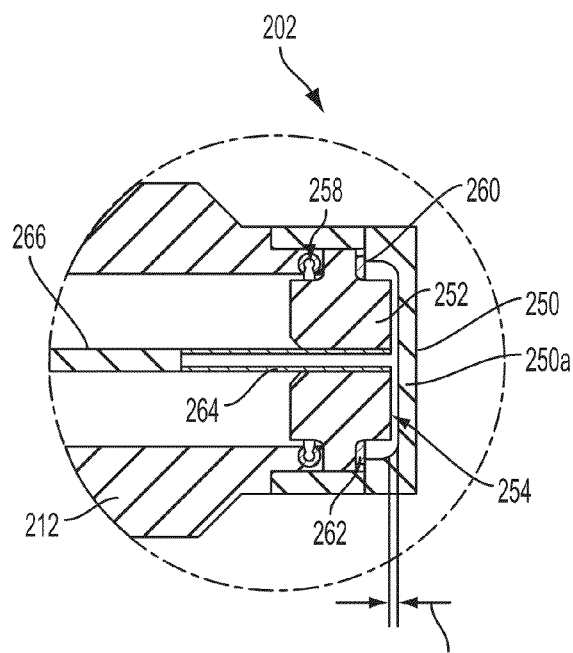
FIG. 3A is an enlarged view of the distal end encircled by line 3A of the pressure sensor depicted in FIG. 3.

FIG. 3A shows an enlarged view of the capacitive pressure sensor 202. The capacitive pressure sensor includes a pressure deflectable diaphragm cap 250 located on the distal end of the probe body 212. The distal end of the pressure deflectable diaphragm cap 250 includes a pressure deflectable diaphragm 250a. The pressure deflectable diaphragm 250a is made from a material suitable to act as an electrode to form the first portion of the capacitive sensor. Alternatively, in embodiments where the pressure deflectable diaphragm 250a is made from a material that does not function as a capacitive surface, a metallization layer may be deposited onto the interior surface of the pressure deflectable diaphragm 250a to function as the capacitive surface. Additionally, the exterior surface of pressure deflectable diaphragm 250a can include a coating, passivation layer, anodized layer, or other appropriate layer to provide a desired abrasion, corrosion, friction, or other desired property to the pressure deflectable diaphragm exterior. The pressure deflectable diaphragm 250a is also electrically coupled to the rigid probe body 212 such that it is electrically and operatively coupled with the intermediate circuit 210 to drive the capacitive pressure sensing circuit. In addition to the pressure deflectable diaphragm, a relatively nondeformable component, such as ceramic disk 252, includes an electrode 254 on a surface oriented towards and spaced from the pressure deflectable diaphragm 250a to form the second portion of the capacitive sensor. Ceramic disk 252 supports and electrically insulates the electrode 254 from the probe body. Electrode 254 can be formed on, or adhered to, the surface of ceramic disk 252 facing the pressure deflectable diaphragm 250a in any appropriate way. For example, in one embodiment, electrode 254 is a plated metallic layer deposited on the surface of ceramic disk 252. Alternatively, a separately formed electrode could be bonded onto the surface as the current disclosure is not limited to the way in which the electrode is formed. To provide the desired pressure sensor output, electrode 254 on ceramic disk 252 is spaced from pressure deflectable diaphragm 250a by a predetermined gap 256. Due to use of the pressure sensor at elevated, as well as variable, temperatures it is desirable to manufacture the pressure sensor components from materials having compatible coefficients of thermal expansion to avoid thermally induced stresses. In instances where it is not possible to match the coefficients of thermal expansion, other design strategies can be employed to mitigate thermally induced stresses as discussed in more detail below.

While the above described components can be made from any appropriate combination of materials, in one embodiment, the components are manufactured from the following materials. The pressure deflectable diaphragm cap 250 and pressure deflectable diaphragm 250a are made from a nickel based superalloy such as UNS N07718. UNS N07718 has a coefficient of thermal expansion of approximately $14.0 \times 10^{-6}/°$ C. at a reference temperature of approximately 400° C. The corresponding relatively nondeformable component embodied by ceramic disk 252 is a high alumina content ceramic, for example, a 99.5% or greater alumina-based ceramic. A ceramic comprising 99.5% alumina has a coefficient of thermal expansion of approximately $7.0 \times 10^{-6}/°$ C. at a reference temperature of approximately 300° C. and a dielectric constant of 9.8+150 ppm/° C. Bushing 206 is made from quartz. Quartz has a coefficient of thermal expansion of approximately $5.5 \times 10^{-7}/°$ C. ($0.55 \times 10^{-6}/°$ C.) at a reference temperature of approximately 350° C. and a dielectric constant of 3.8+28 ppm/° C. The intermediate component is made from Fe/Ni/Co alloys such as UNS K94610 and TNS N19909 or Titanium alloys such as Ti-6242. UNS K94610 has a coefficient of thermal expansion of approximately $5.3 \times 10^{-6}/°$ C. at a reference temperature of approximately 400° C. UNS N19909 has a coefficient of thermal expansion of approximately $7.7 \times 10^{6}/°$ C. at a reference temperature of approximately 400° C. Ti-6242 has a coefficient of thermal expansion of approximately $9.2 \times 10^{-6}/°$ C. at a reference temperature of approximately 315° C. The probe body is made from 17-4 stainless steel.

The capacitive pressures sensor comprising the pressure deflectable diaphragm 250a and electrode 254 are electrically coupled to the intermediate circuit by the rigid probe body and a lead 266. The electrode 254 is electrically coupled to the lead via lead pin 264. In some embodiments, the lead 266 and/or lead pin 264 comprise a tubular shape to increase the flexural stiffness and the corresponding lateral vibration frequencies of those components. However, in other embodiments, the lead 266 and/or lead pin 264 comprise a solid wire. Due to the relative polarizations of the lead and rigid probe body it is desirable to either shield or minimize the shunt capacitance between these components. In one embodiment, the shunt capacitance is minimized by concentrically arranging lead pin 264 and lead 266 within the rigid probe body 212 to form an annular gap between the lead and the wall of the rigid probe body. As described in more detail below, the annular gap corresponds to an air gap which provides electrical isolation and minimizes the shunt capacitance between the lead/lead pin relative to the wall of the rigid probe body. In another embodiment, the lead/lead pin are shielded from the rigid probe body using a semi-rigid coaxial cable located within the rigid probe body interior bore.

As previously noted, the pressure sensor probe is used in a variable temperature environment. Due to differences in the coefficients of thermal expansion of the various components within the pressure sensor probe, thermally induced stresses may be present. More specifically, thermally induced stresses are present at the interface between the ceramic disk and the pressure deflectable diaphragm cap due to the different coefficients of thermal expansion between these components leading to expansion and contraction of these components relative to each other as the temperature changes. Depending upon the specific construction and arrangement of the components, this can lead to shifting of components relative to each other as well as possible fatigue and cracking of the components.

If the ceramic disk shifts its axial position relative to the pressure deflectable diaphragm, the gap 256 will have a corresponding change resulting in a change in the output pressure sensor signal. One way in which to mitigate the ceramic disk from shifting relative to the pressure deflectable diaphragm, is to provide a spring 258 that axially biases the ceramic disk 252 towards the pressure deflectable diaphragm 250 to ensure that the ceramic disk remains seated at the bottom of the pressure deflectable diaphragm counterbore 260 over the entire operating temperature range (e.g. −40 to 400° C.). As depicted in the figure, spring 258 is a C-ring spring that is slightly compressed in the assembled system such that it applies an axially oriented force to a proximal surface of the ceramic disk to bias at towards the pressure deflectable diaphragm. While a C-ring spring has been depicted, any appropriate spring could be used. The axial stiffness of the spring is selected to provide a relatively constant force to the ceramic disk during thermal expansion and contraction. Without wishing to be bound by theory, in some embodiments, the spring is constructed and arranged to avoid applying any lateral forces to the ceramic disk to help mitigate the generation of any radial tensile forces therein. To avoid high temperature deflection setting of the spring during long-term operation, it is desirable to provide a high temperature spring alloy such as, UNS NO7718 Nickel based superalloys. While spring 258 is depicted as a separate component, in some embodiments, spring 258 is integrated into the rigid probe body as a flexible feature that retains, and applies a force to, ceramic disk 252.

In addition to creating possible axial offsets of the ceramic disk, the relative contraction and expansion of the ceramic disk and pressure deflectable diaphragm cap, when combined with the axial force provided by the spring, results in a radial tensile stress in the ceramic disk due to frictional loading at the interface between the ceramic disk and pressure deflectable diaphragm cap. In the present embodiment, this frictional loading occurs where ceramic disk 252 contacts a shelf of counterbore 260. To reduce the possibility of cracking and/or fatigue fracture of the ceramic disk, it is desirable to include an intermediate component disposed between the ceramic disk and pressure deflectable diaphragm cap. The intermediate component can act to isolate the ceramic disk from the pressure deflectable diaphragm cap to reduce the transferred radial stresses. As depicted in FIG. 3A, the intermediate component is an annular shim 260 positioned between the ceramic disk and pressure deflectable diaphragm cap. Generally, the intermediate component has a coefficient of thermal expansion that is less than the coefficient of thermal expansion of the pressure deflectable diaphragm cap. In some embodiments, the coefficient of thermal expansion of the intermediate component is between the coefficients of thermal expansion of the ceramic disk and pressure deflectable diaphragm cap. In other embodiments, the coefficient of thermal expansion for the intermediate component is less than the coefficient of thermal expansion of the ceramic disc. In yet another embodiment, the coefficient of thermal expansion is substantially similar to the coefficient of thermal expansion of the ceramic disk. Without wishing to be bound by theory, the reduction in the intermediate component's coefficient of thermal expansion, as compared to the pressure deflectable diaphragm, results in a reduction of the radial tensile stresses being transferred between the ceramic disk and pressure deflectable diaphragm cap. In addition to providing a lower coefficient of thermal expansion, the intermediate component can also include a coating, or be made out of, a material with a low coefficient of friction to further reduce the transferred radial stresses between the ceramic disk and pressure deflectable diaphragm cap. In other embodiments, the intermediate component can also include a coating, or is made out of, a material that is a high hardness material. Without wishing to be bound by theory, such an embodiment may help to prevent the ceramic disk from deforming the intermediate component which would change the gap between the opposing capacitive surfaces resulting in a zero output shift in the output sensor signal. Examples of materials appropriate for use in the intermediate component include controlled expansion and low expansion alloys such as: iron-nickel-cobalt alloys such as ASTM alloy F-15; nickel-iron alloys such as ASTM alloy 52 and ASTM alloy 48; titanium and titanium alloys; and other appropriate materials as the material is not limited to the particular alloys and materials disclosed herein.

While the intermediate component has been depicted as being separate from the ceramic disk and pressure deflectable diaphragm cap, the intermediate component could be embodied as a coating or surface finish applied to either of the ceramic disk and/or pressure deflectable diaphragm cap. For example, in one embodiment, a coating having an intermediate coefficient of thermal expansion as well as a low coefficient of friction is applied to the surface of the pressure deflectable diaphragm cap contacting the ceramic disk. Alternatively, the coating could be applied to the ceramic disc, or the coating could be applied to both the pressure deflectable diaphragm and the ceramic disk.

Figure 4:
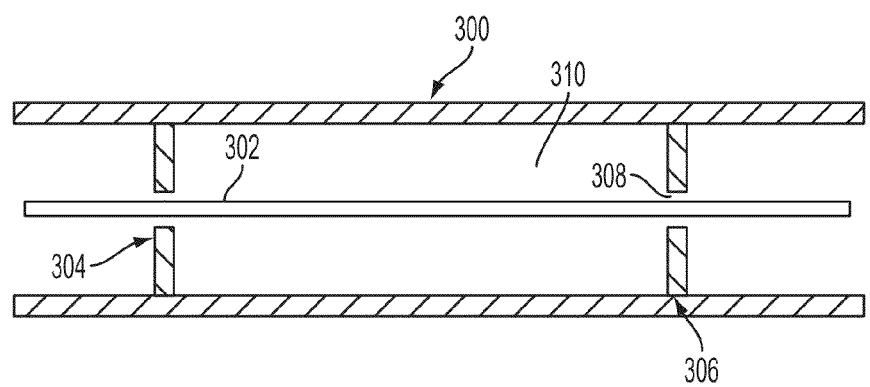
FIG. 4 is a schematic cross-sectional view of a portion of a section of the probe body of the pressure sensor.

In addition to providing robust components and systems capable of continuously sensing pressures at elevated temperatures, it is also desirable to reduce the signal loss associated with the output pressure signal to improve the sensitivity and fidelity of the signal. Since the sensitivity of the measurement is inversely proportional to the total capacitance of the capacitive pressure sensing circuit, it is desirable to reduce stray capacitances within the probe to reduce the total capacitance of the capacitive pressure sensing circuit. One way in which to reduce signal loss is to reduce the shunt capacitance of the lead 302 relative to the walls of the rigid probe body 300 as shown in FIG. 4. The shunt capacitance between the lead and rigid probe body is minimized by maintaining the lead approximately in the center of the rigid probe body for substantially the entire length of the lead. Thus, an annular air gap 310 isolates the lead 302 from the inner wall of the rigid probe body 300. Due to the low dielectric constant of air, the resulting shunt capacitance between the lead and rigid probe body is reduced as compared to an annular gap comprising a solid material with a larger dielectric constant. In addition to arranging the lead concentrically within the rigid probe body, it is desirable to minimize lateral vibrations of the lead to minimize the excursions of the lead from the concentric position. Consequently, it is desirable that the lead have lateral frequencies of vibration above a preselected minimum as determined for a particular application such that the first natural frequency of vibration in the lateral direction is substantially above the expected vibration frequencies in the intended application.

In addition to the primary bushing discussed above, as depicted in FIG. 4, in one embodiment, lead 302 is also substantially concentrically located in the rigid probe body 300 through the use of supports 304 supporting the lead 302. However, in embodiments where a secondary tube, such as a shielding tube or temperature sensor securing tube, is used within the rigid probe body, supports 304 are located within the secondary tube. In the depicted embodiment, the supports are disk-shaped components that have an outer circumference 306 that is captured within the bore of the rigid probe body 300. The depicted supports 304 also include a hole 308 through which the lead passes and is supported. The plurality of supports are intermittently spaced along the rigid probe body to minimize the static deflection of the lead. Further, the spacing between the supports is selected to provide natural frequencies of lateral vibration above a preselected minimum vibration frequency. In order to avoid unnecessary increases in the shunt capacitance between the lead and rigid probe body, it is desirable fabricate the supports from a relatively low dielectric constant material. In addition, to prevent the supports from thermally expanding inward and possibly compressing the lead and locking it in place relative to the rigid probe body, it is desirable that the supports be made from a relatively low coefficient of thermal expansion material. Suitable materials include, but are not limited to, quartz, ceramic, and fused silica.

In an alternative embodiment, the shunt capacitance between the lead 302 and rigid probe body 300 is reduced through the use of a shielding sleeve located between the lead and wall of the rigid probe body. In the shielded configuration, it is less critical to maintain the lead perfectly centered within the shielding sleeve.

In some embodiments, it is desirable to include a temperature sensor in the distal pressure sensing end of the probe to measure the process temperature to allow for temperature compensation of the signal and/or output of the process temperature. Appropriate temperature sensors include, but are not limited to, thermocouples, thermistors, and other appropriate temperature sensing devices. However, regardless of the specific temperature sensing device, temperature sensor leads would necessarily need to traverse the length of the probe body to output the temperature. The presence of these temperature sensor leads, and/or their metal sheaths, result in capacitive leakage from the capacitive pressure sensor lead. Further, any movement of the temperature sensor leads within the probe body would alter the capacitance between the capacitive pressure sensor lead and the temperature sensor leads, resulting in undesirable shifts in the capacitive pressure signal output.

In one embodiment, the temperature sensor leads are distanced from the lead 402 to reduce the capacitive leakage. As depicted in FIGS. 5-5B, a channel is formed in the wall of the rigid probe body 400 extending from the proximal to distal end thereof. The temperature sensor leads are positioned in a channel. The channel can be a groove 404, a bore 405, or any other appropriate feature formed in the wall of the rigid probe body capable of retaining the temperature sensor leads. Since the channel is formed in the wall of the rigid probe body, the temperature sensor leads are positioned further away from the lead 402 than if they were located within the interior portion of the probe body bore. This increased distance results in a reduced capacitance between the temperature sensor leads and lead 402. In addition, as discussed in more detail below, lead 402 can be shielded from the temperature sensor leads disposed of in the channel. The channel is formed in the rigid probe body 400 using any appropriate method including, but not limited to, electrical discharge machining, grinding, or other appropriate machining process. To permit output of the temperature signal, a corresponding channel 406 is formed in a base portion 414 (FIG. 5A) of the probe body and a cutout 408 is formed in bushing 416. These features, channel 406 and outlet 408, are substantially aligned with the groove 404. As depicted in the figure, and discussed in more detail above, the bushing 416 is a thin quartz disk, or other appropriate material, located within the base portion 414 of the probe body to substantially concentrically support the lead in the center of the probe body.

Figure 6:
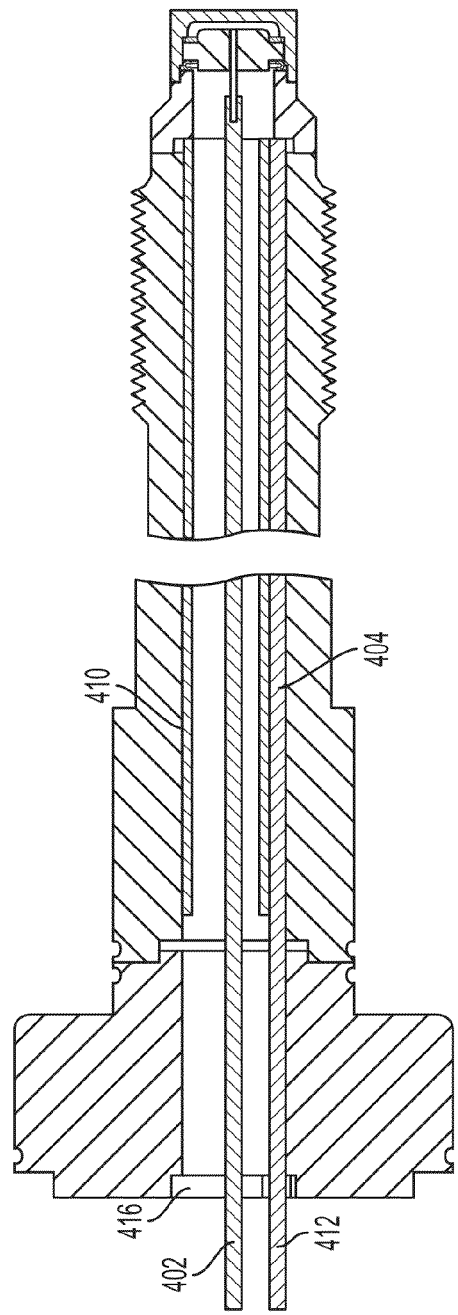
FIG. 6 is a schematic cross-sectional view of a temperature sensor disposed in a temperature sensor channel in the probe body of the pressure sensor.

To prevent shifts in the output capacitive pressure signal, it is desirable to ensure that the temperature sensors are retained in the channel. Consequently, in some embodiments, the temperature sensor leads are brazed, welded, or attached to the channel using other appropriate attachment methods. However, it should be noted that restraining axial movement of the temperature sensor leads at one or more points within the channel could lead to increased stresses due to a mismatch in the coefficients of thermal expansion of the temperature sensor leads and the rigid probe body. Thus, in some embodiments the temperature sensor leads are permitted to axially slide within the channel. In one such embodiment, as shown in FIG. 5A-5B including a groove 404, a temperature sensor securing tube 410 is provided within the internal bore of the rigid probe body to retain the temperature sensor leads within groove 404. In addition to retaining the temperature sensor leads within groove 404, temperature sensor securing tube 410 can also act to shield lead 402 to further reduce the shunt capacitance in addition to the reduction in shunt capacitance from moving the temperature sensor leads outside the main portion of the probe body bore. As shown in the figure, the temperature sensor securing tube 410 is axially aligned with and press fit into the central bore of the rigid probe body 400, holding the temperature sensor leads in the channel and outside the outer diameter of the temperature sensor security tube. Alternatively, the temperature sensor securing tube could be secured in position using brazing, welding, and arrangements, fasteners, or any other appropriate method. Regardless of the specific attachment method, the, temperature sensor securing tube 410 is substantially maintained in a concentric arrangement with lead 402 while maintaining the temperature sensor leads within groove 404. FIG. 6 shows a schematic representation of a temperature sensor probe 412 positioned in groove 404 and retained by temperature sensor securing tube 410. As described above, the temperature sensor probe 412 is output through bushing 416.

Figure 7:
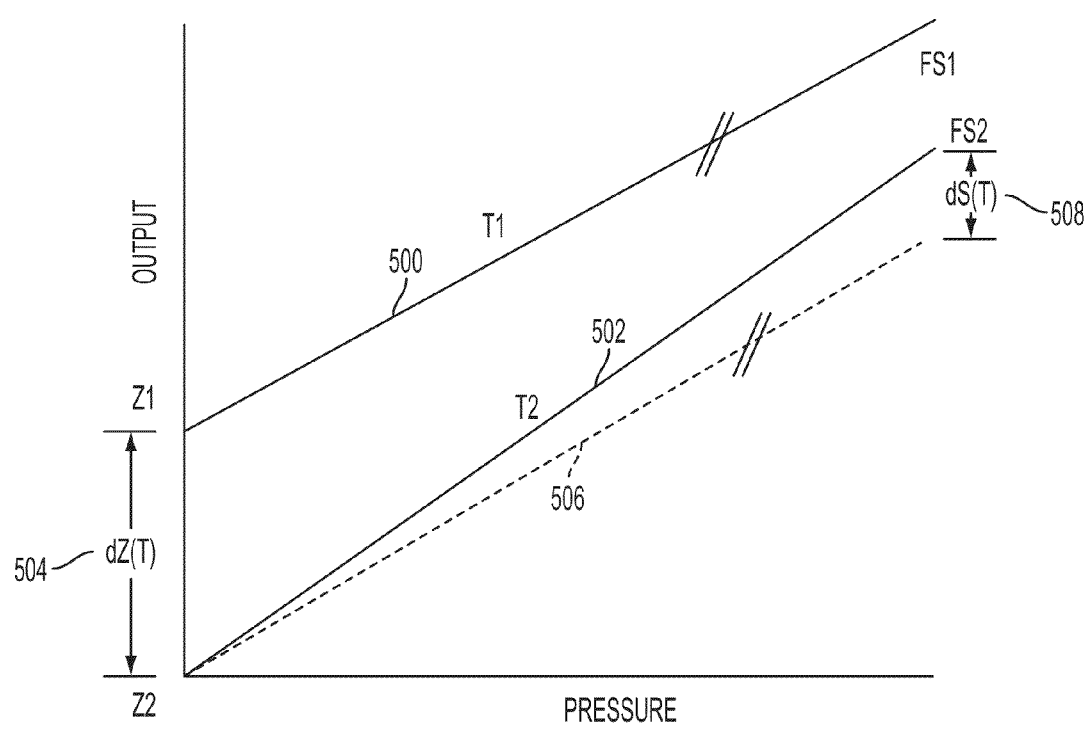
FIG. 7 is a graph depicting the zero output and span change of the capacitive pressure sensor between two different temperatures.

FIG. 7 presents an exemplary graph of a capacitive pressure sensor output versus pressure for two different temperatures. In the depicted graph, the lower temperature corresponds to line 500 and the higher temperature corresponds to line 502. Due to changes in part geometry and material properties from thermal expansion and changes in dielectric constant versus temperature, the high and low temperature pressure sensor outputs differ from one another. Shift 504 is the zero output shift of the pressure sensor corresponding to the change in the output signal at zero pressure when the temperature is raised from low temperature 500 to the higher temperature 502. Without wishing to be bound by theory, the shift in the zero output is due to changes in the capacitance of the pressure sensor versus temperature. As shown in the figure, the difference in the output signal between the different temperatures at the maximum applied pressure is attributed to more than just the shift in the zero output signal. This is due to a shift 508 in the sensor span at the different temperatures. It should be noted, that the sensor span at a particular temperature generally corresponds to the full-scale output at maximum pressure minus the zero output at that temperature. Without wishing to be bound by theory, changes in the span are believed to correspond to the modulus of elasticity of the pressure deflectable diaphragm decreasing with increasing temperature. This leads to increased deflection of the pressure deflectable diaphragm at higher temperatures resulting in an increased change in the pressure sensor signal for a given pressure.

It should be understood that the above presented graph is only a schematic representation for illustrative purposes regarding the temperature induced changes for a single pressure sensor arrangement. Consequently, the expected change in sensor output versus pressure for different temperatures will vary for different pressure sensor arrangements. Therefore, the current disclosure includes embodiments exhibiting changes in the pressure sensor output versus temperature that are different from that disclosed in FIG. 7.

In order to output a corrected pressure signal, it is desirable to compensate for both the zero output shift 504 and the span shift 508 at any given temperature. While it is possible to compensate for either effect through the use of a temperature sensor and associated temperature correction algorithms at the main circuit, in some embodiments it is desirable to compensate for one or both of the zero output shift and span shift through component design and material selection as described in more detail below. Thus, the pressure sensor can intrinsically compensate for shifts in pressure sensor performance versus temperature without the need to sense the operating temperatures for use in signal correction by external circuitry. Consequently, in some embodiments, it is possible to eliminate the need for a distally located temperature sensor which helps to eliminate at least one source of signal loss (i.e. stray capacitive losses between the capacitive pressure sensor lead and temperature sensor leads as described above) in addition to overall reduction in complexity of the pressure sensor.

Figure 8:
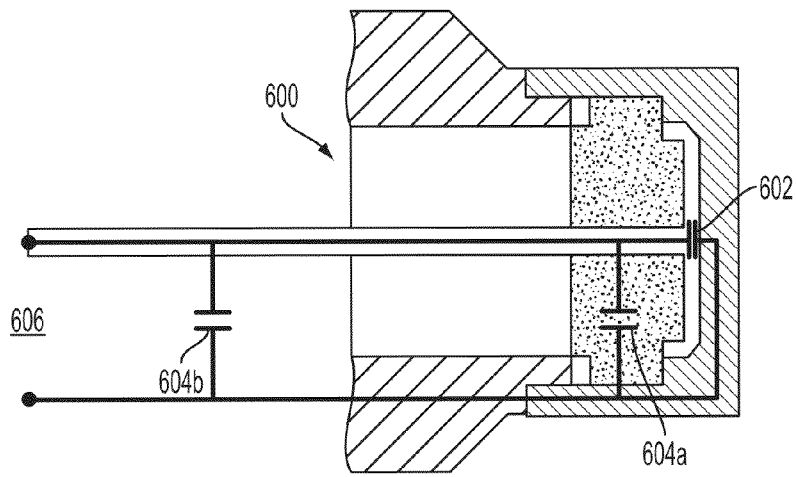
FIG. 8 is a schematic representation of many of the capacitances associated with the pressure sensor.

As shown in FIG. 8, the capacitive pressure sensor 600 includes a sensor capacitance 602 that varies with pressure induced deflections of the electrode on the pressure deflectable diaphragm toward the ceramic disk as described above in more detail. Further, the capacitive pressure sensor 600 also includes shunt capacitances 604a and 604b. Shunt capacitance 604a corresponds to the capacitance between the components of the pressure sensor and the probe body through the relatively rigid component corresponding to the ceramic disc. Shunt capacitance 604b corresponds to the capacitance between the lead and probe body through the annular gap of the probe body. The total sensed capacitance 606 of the pressure sensor is a parallel combination of the sensor capacitance 602 and the shunt capacitances 604a and 604b. Therefore, the output pressure signal is altered by changes in either the sensor capacitance 602 or the shunt capacitances 604a and 604b.

Since the pressure signal can be altered by changes in either the sensor capacitance or the shunt capacitance, in one embodiment, the shift in zero output due to alterations in the sensor capacitance versus temperature is compensated for by providing an offsetting change in the shunt capacitances versus temperature. More specifically, in some embodiments, the change in the shunt capacitance 604 is approximately equal and opposite to the change in the sensor capacitance 602. For example, as the sensor capacitance decreases with increasing temperature, the shunt capacitance increases with increasing temperature. Thus, the total sensed capacitance 606 is approximately the same over a predetermined temperature range without the need to compensate for the temperature change, such as by using a temperature sensor and corresponding circuitry.

Figure 9:
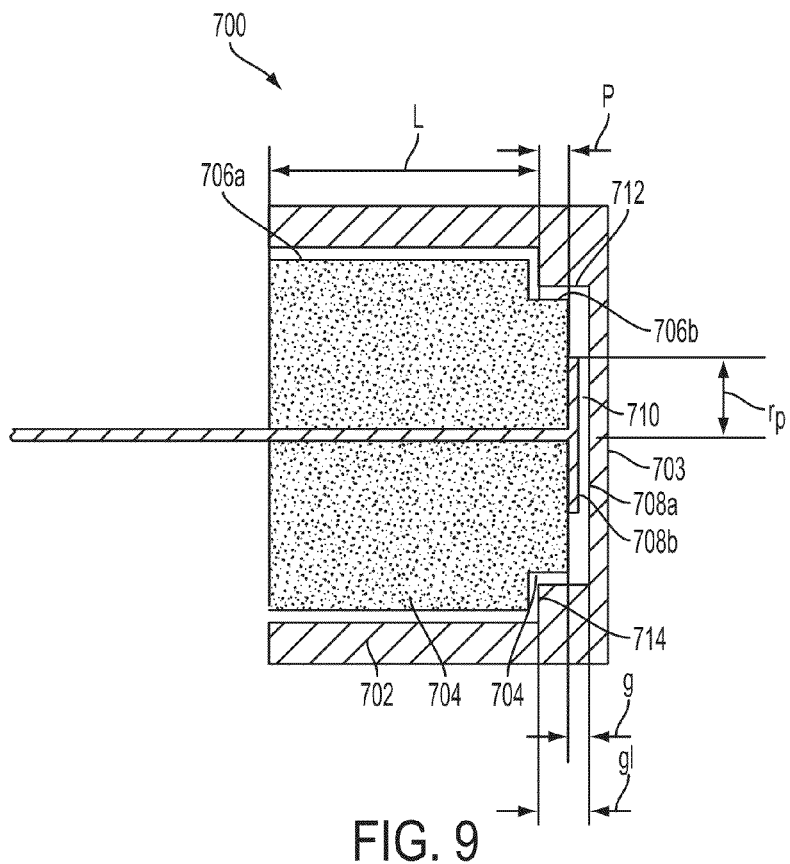
FIG. 9 is a schematic representation of the distal end of the pressure sensor.

As noted above, the shift in zero output of the capacitive pressure sensor is due to changes in the capacitance of the pressure sensor. This effect is described in relation to FIG. 9, showing a distal, or sensing end, of a pressure sensor. As depicted in FIG. 9, the pressure sensor 700 includes a pressure deflectable diaphragm cap 702 and a relatively nondeformable component, in this example a ceramic disk 704. The pressure deflectable diaphragm cap 702 includes a diaphragm 703 and ceramic disk 704 include respective first and second capacitive surfaces 708a and 708b corresponding to opposing electrodes that define the capacitive sensor. The ceramic disk includes a body 706a with a length "L". The ceramic disk also includes a protrusion 706b extending from a ledge 707 of the ceramic disc. The protrusion has a length "P". The second capacitive surface 708b is disposed on protrusion 706b such that it is spaced from the first capacitive surface 708a by a gap 710 with a length "g". The ledge 707 on ceramic disk body 706a is spaced from the capacitive surface 708a by a distance "gl" corresponding to the length of the counterbore 712 from shoulder 714 to the first capacitive surface 708a. Without wishing to be bound by theory, the gap between the first and second capacitive surfaces increases with increasing temperature due to protrusion 706b expanding at a slower rate as compared to the counterbore 712. This is due to the ceramic disk having a lower coefficient of thermal expansion as compared to the pressure deflectable diaphragm cap. It is noted that, the sensor capacitance is inversely related to the gap length "g". Therefore, as the temperature increases, the sensor gap increases leading to the noted decrease in the pressure sensor capacitance.

Figure 10:
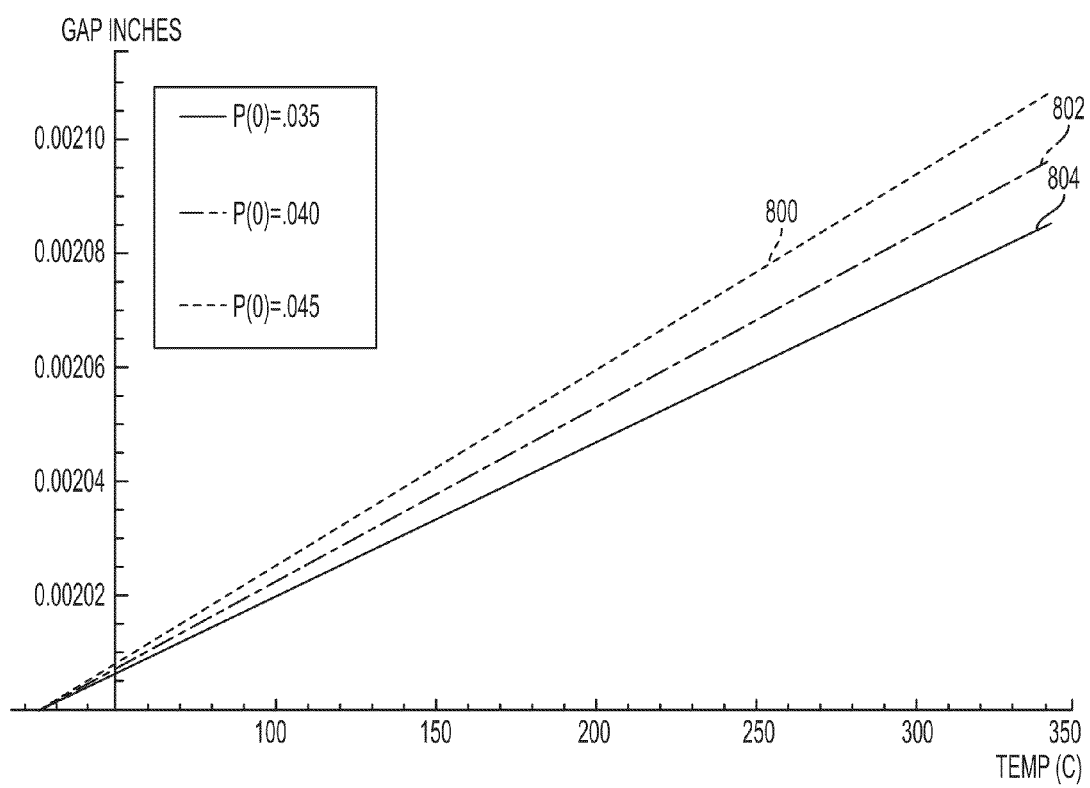
FIG. 10 is a graph showing changes in the gap versus temperature.

In one embodiment, the rate at which the gap increases is controlled by modifying the ceramic disk protrusion length "P", the length of the counter bore "gl" on the pressure deflectable diaphragm cap, and selecting materials for each with specific coefficients of thermal expansion. Such an effect is illustrated in FIG. 10 which depicts a graph of the change in gap "g" versus increasing temperature for different initial protrusion lengths of 0.045 inch (800), 0.040 inch (802), and 0.035 inch (804). In the depicted examples, "gl" is also varied relative to "P" such that each one has approximately the same initial gap at 25° C. As shown in the figure, the rate of change in gap "g" is related to the initial protrusion length such that increasing the initial protrusion length corresponds to increasing rates of change in the gap versus temperature.

While it is possible to control the rate at which the pressure sensor capacitance changes, as noted above, it is desirable that the decrease in the pressure sensor capacitance be compensated for by a corresponding increase in the shunt capacitance. In one embodiment, the ceramic disk is made of a material that has a dielectric constant that increases with temperature. Therefore, the shunt capacitance associated with the portion of the pressure sensor including the ceramic disk increases with increasing temperature. In such an embodiment, the length of the ceramic disk body, the thermal coefficient of dielectric constant of the ceramic disk body, and the rate at which the gap increases are selected such that the total sensed signal is approximately the same over a predetermined temperature range without the need for a temperature measurement to compensate for that temperature change. In one instance, the predetermined temperature range is approximately from −40° C. to approximately 400° C. Further, the thermal coefficient of dielectric constant for the ceramic disk can be selected and/or engineered to be any appropriate value to balance the expected variation in the sensor capacitance versus temperature. Thus, by selecting appropriate combinations of initial gap length, pressure deflectable diaphragm cap geometry (such as the counterbore depth), ceramic disk body length as well as material properties such as coefficients of thermal expansion and thermal coefficients of dielectric constant, it is possible to provide intrinsic compensation of the pressure sensor for changes in the zero output.

Figure 11:
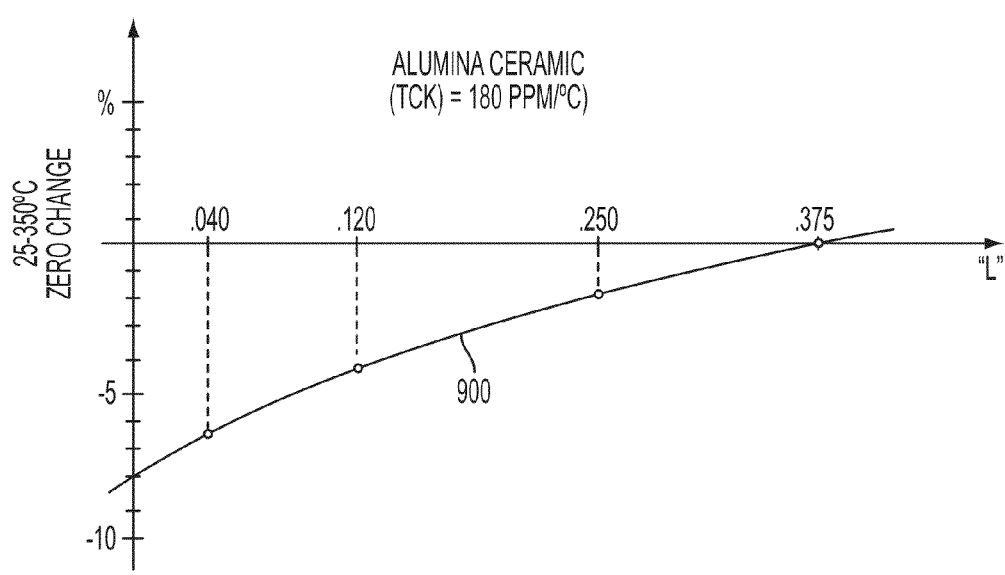
FIG. 11 is a graph of percent zero output change from 25° C. to 350° C. versus changes in component dimension "L" from FIG. 9.

FIG. 11 depicts a simplified example of determining an appropriate body length L for the ceramic disk to compensate for the zero output change of the pressure sensor. The ceramic disk has a thermal coefficient of dielectric constant of 180 ppm/° C. The figure depicts an extrapolated line 900 corresponding to the percent change in the total sensed signal over a temperature range of 25° C. to 350° C. for various lengths of a ceramic disk body. As shown in the figure, the body length L is increased until the change in the shunt capacitance versus temperature is able to compensate for the changes in the sensor capacitance versus temperature. At this point, the two effects cancel each other out and a substantially constant total sensed signal is output. The point at which this occurs in the current example corresponds to a body length of approximately 0.375 inches.

Figure 12:
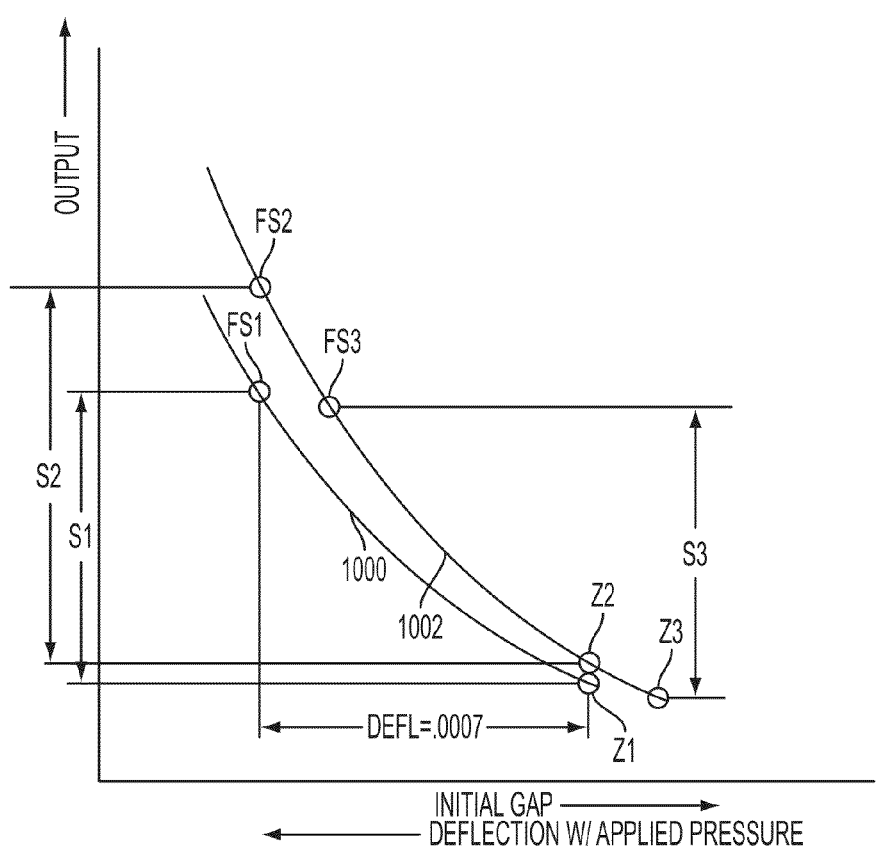
FIG. 12 is a graph of output spans for the same pressure sensor at different temperatures with different initial capacitor gaps "g" from FIG. 9.

While the above description and example are directed to compensating for changes in the zero output versus temperature, as previously noted, it is also desirable to compensate for changes in the capacitive pressure sensor span. Several non-limiting examples of parameters which affect the capacitive pressure sensor span include, but are not limited to, changes in the gap length due to thermal expansion and changes in the pressure deflectable diaphragm's modulus of elasticity versus temperature. An example of these parameters and their competing effects on the capacitive pressure sensor span is depicted in FIG. 12. The graph presents the output capacitive pressure sensor signal versus the gap length between the capacitive surfaces of the pressure sensor. Points located towards the right of the graph correspond to increasing initial gap lengths. These initial gap lengths are then compressed by a preselected deflection corresponding to a pressure being applied to the pressure deflectable diaphragm.

The graph depicts the output signals from a pressure sensor at a lower first temperature 1000 and a higher second temperature 1002. The pressure sensor corresponding to the lower temperature 1000 includes an initial gap length Z1 at zero pressure (and corresponding output capacitance) and an initial full-scale output FS1 when subjected to the maximum deflection. The output signal of the pressure sensor at the lower temperature 1000 has a first span S1. If the initial gap length is Z2 for the pressure sensor at the higher temperature 1002, which corresponds to the same initial gap length Z1 as the lower temperature, the pressure sensor will have a larger full-scale output FS2 at the maximum deflection and a correspondingly larger second span S2 as compared to the pressure sensor at a lower temperature. This change in the span alters the relation between the pressure and output signal. Therefore, it is desirable to compensate for this span change.

Without wishing to be bound by theory, due to the nonlinear nature of the pressure sensing capacitance, the span is strongly influenced by the initial gap length. More specifically, due to the output signal being inversely proportional to the gap length between the two capacitive surfaces, the pressure sensor output signal exhibits a decreasing slope with increasing initial gap lengths. Therefore, larger initial gap lengths correspond to smaller pressure sensor spans for a given amount of deflection. This effect can be combined with the altered pressure sensor performance at higher temperatures to control the shift in the span of the pressure sensor. For example, when operating at the higher temperature 1002, if the initial gap length is shifted to a larger initial gap length Z3, the full-scale output FS3 at this higher temperature is reduced thus resulting in a reduction in a corresponding third span S3 as compared to span S2. In some embodiments, the initial gap length Z3 at the higher temperature is selected such that the third span S3 is substantially the same as the first span S1. Consequently, in such an embodiment, the capacitive pressure sensor output span is substantially constant over a predetermined temperature range. For example, the capacitive pressure sensor output span can be substantially constant from approximately 25° C. to approximately 350° C. The decrease in span versus increasing gap length is illustrated in Table I below which was calculated assuming a fixed maximum pressure deflectable diaphragm displacement of 0.00075 inches for an exemplary pressure sensor.

TABLE I

| Gap | Zero (pF) | Span (pF) |
|---|---|---|
| .0015 | 1.69 | 0.41 |
| .00175 | 1.6 | 0.39 |
| .002 | 1.5 | 0.32 |

In view of the above, in one embodiment, the increase in the capacitive pressure sensor span due to a reduction in the modulus of elasticity of the diaphragm is offset by a corresponding increase in the gap length which acts to correspondingly decrease the capacitive pressure sensor span. As described with regards to FIG. 7, the gap length changes versus temperature due to a mismatch between the coefficients of thermal expansion of the pressure deflectable diaphragm and the corresponding ceramic disk holding the opposing capacitive surfaces that form the capacitive pressure sensor. Therefore, in order to offset the noted increase in the span due to changes in the modulus of elasticity versus temperature, it is desirable to provide a corresponding controlled rate of change of the gap length versus temperature. The rate of change of the gap length versus temperature can be controlled, as explained, by altering the geometry of the components as well as selecting materials with specific coefficients of thermal expansion.

In an embodiment similar to that shown in FIG. 9, the length of the protrusion protruding into the diaphragm expands in an axial direction at a slower rate than the corresponding counterbore of the pressure deflectable diaphragm cap. This is due to the ceramic disk having a lower coefficient of thermal expansion as compared to the pressure deflectable diaphragm cap. It should be noted that larger counterbore lengths in the pressure deflectable diaphragm cap combined with larger protrusion lengths on the ceramic disk result in increased rates of growth of the gap length at higher temperatures. Thus, the protrusion length of the ceramic disk and the corresponding counterbore length in the pressure deflectable diaphragm cap can be selected to provide a specific rate of change in gap length versus temperature to substantially offset the span increases associated with changes in the modulus of elasticity. More generally, it is possible to offset the increase in span versus temperature by altering component geometry and selecting specific coefficients of thermal expansion of the components in the pressure sensor to control the rate at which the gap opens or increases with increasing temperature. It should be understood that the specific relation between the protrusion length and counterbore length changes for different combinations of coefficients of thermal expansion.

In one specific embodiment, the pressure deflectable diaphragm is made from nickel-chromium based alloys such as UNS N07718 with a modulus of elasticity that decreases at a rate of approximately −2.6% per 100° C. In such an embodiment, the span therefore will increase at a rate of approximately 2.6%/100° C. Therefore, the specific geometry and coefficients of thermal expansion of the components in the capacitive pressure sensor are selected to provide a corresponding decrease in the span of approximately −2.6%/100° C. due to a preselected rate of increase in the gap length versus temperature.

While described separately, it should be understood that the above disclosed methods for correcting the variations in zero output and pressure sensor span can be incorporated into a single pressure sensor. Thus, a pressure sensor can be provided that intrinsically corrects for both variations in zero output and pressure sensor span without the need for an additional temperature sensor.

EXAMPLE

Figure 13:
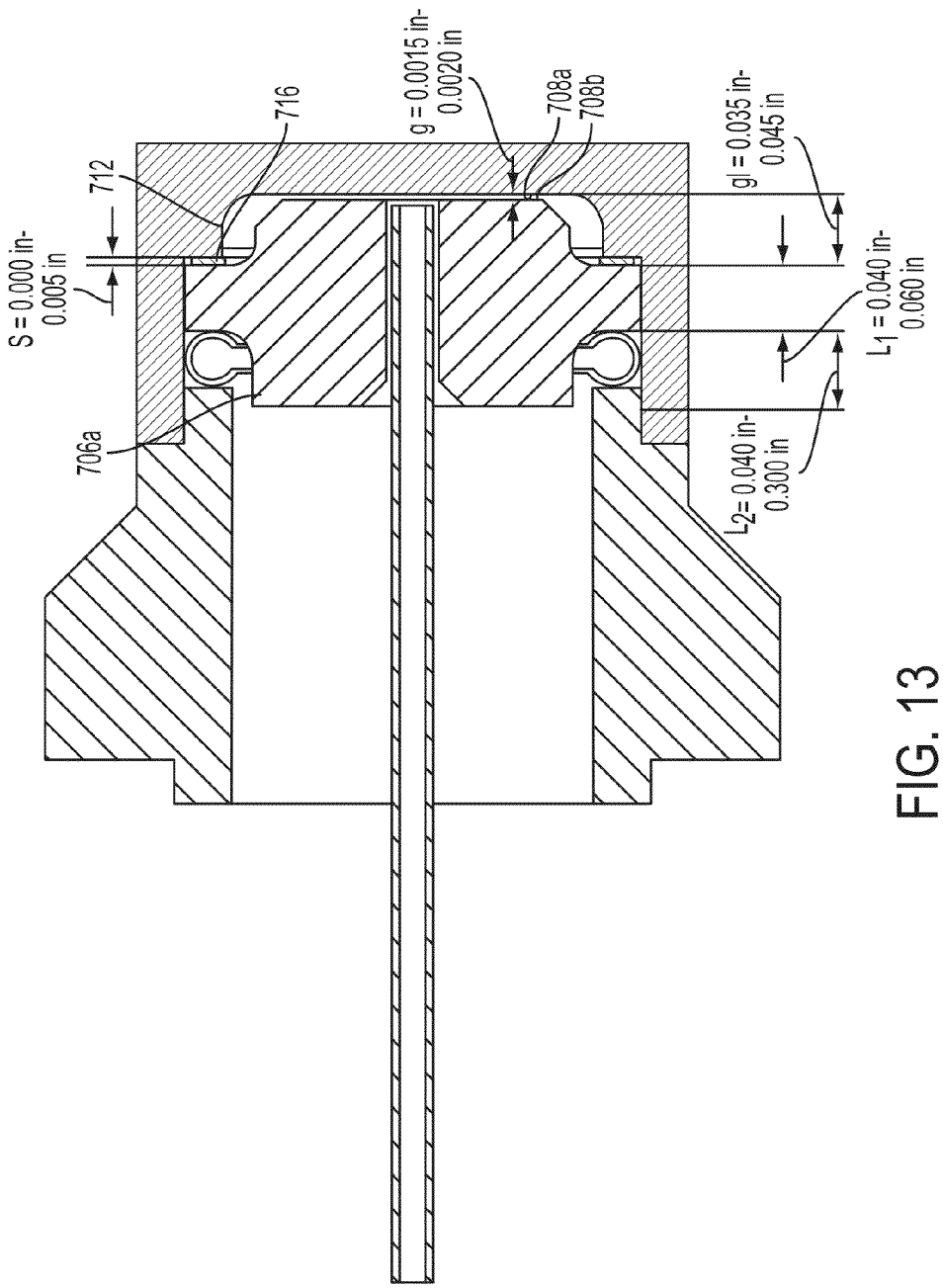
FIG. 13 is a schematic representation of a portion of an exemplary pressure sensor.

One exemplary embodiment of a portion of the pressure sensor is depicted in FIG. 13. In the depicted embodiment, the pressure sensor includes a gap "g" between the capacitive surfaces 708a and 708b that is between approximately 0.0015 inches to approximately 0.0020 inches. The electrode present on the second capacitive surface 708b, not depicted, corresponds to a metallization layer with a total thickness between approximately 0.0006 inches to approximately 0.0013 inches. The metallization layer comprises a molybdenum-manganese metallization layer that is fired to adhere it to the underlying ceramic. An alloy of nickel and gold is subsequently plated onto the molybdenum-manganese substrate to form the overall metallization layer that forms the electrode. The counterbore 712 of the pressure flexible diaphragm has a depth "g1" between approximately 0.035 inches to approximately 0.045 inches. The length of ceramic disk body 706a, as described above, corresponds to two separate lengths "$L_1$" corresponding to the full diameter portion of the ceramic disk and "$L_2$" corresponding to a reduced diameter portion on the proximal end of the ceramic disk to accommodate the biasing spring. In the depicted embodiment, "$L_1$" is between approximately 0.040 inches to approximately 0.060 inches and "$L_2$" is between approximately 0.040 inches to approximately 0.300 inches. In addition to the above components and dimensions, an intermediate component 716, is included in the depicted embodiment. The intermediate component has a thickness "s" between approximately 0 inches to approximately 0.005 inches. A thickness of 0 inches corresponds to an embodiment that does not include an intermediate component. While the above dimensions are given in inches, they are easily converted into SI units using a conversion factor of 2.54 cm per inch. Further, it should be understood that while exemplary values for the components dimensions have been given, other configurations of the disclosed pressure sensor with different dimensions and arrangements of components are also possible.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:
1. A pressure sensor, comprising:
a probe body comprising a pressure deflectable diaphragm end formed of a first material having a first coefficient of thermal expansion, the diaphragm end including a first surface at least partially defining a first portion of a capacitor;
a relatively non-deformable component formed of a second material having a second coefficient of thermal expansion, the relatively non-deformable component including a second surface spaced from the first surface, the second surface at least partially defining a second portion of the capacitor; and
an intermediate component disposed at a peripheral region, the intermediate component isolating the pressure deflectable diaphragm end and the relatively non-deformable component from each other, the intermediate component being formed of a third material having a third coefficient of thermal expansion;
wherein the third coefficient of thermal expansion is less than the first coefficient of thermal expansion.

2. The pressure sensor according to claim 1, wherein the third coefficient of thermal expansion is similar to the second coefficient of thermal expansion.

3. The pressure sensor according to claim 1, wherein the third coefficient of thermal expansion is less than the second coefficient of thermal expansion.

4. The pressure sensor according to claim 1, wherein the relatively non-deformable component comprises a disk shaped component formed of alumina.

5. The pressure sensor according to claim 1, wherein the relatively non-deformable component is spring biased toward the pressure deflectable diaphragm end.

6. The pressure sensor according to claim 5, wherein the relatively non-deformable component is spring biased between the probe body and the pressure deflectable diaphragm end.

7. The pressure sensor according to claim 1, wherein the intermediate component comprises an iron-nickel-cobalt alloy.

8. The pressure sensor according to claim 1, wherein the intermediate component comprises titanium.

9. The pressure sensor according to claim 1, wherein the intermediate component comprises an annular shim.

10. The pressure sensor according to claim 1, wherein the intermediate component is formed as a coating on at least one of the pressure deflectable diaphragm end and the relatively non-deformable component.

11. The pressure sensor according to claim 1, wherein the intermediate component is constructed and arranged to reduce thermally induced radial tensile stress between the non-deformable component and the pressure deflectable diaphragm end.

12. The pressure sensor according to claim 1, wherein the intermediate component is disposed at a peripheral region between the first and second surfaces.

13. The pressure sensor according to claim 1, wherein the pressure deflectable diaphragm end is formed of metal.

14. The pressure sensor according to claim 1, wherein the relatively non-deformable component is formed of a relatively electrically insulative material and wherein the second surface comprises a metallization layer.

15. The pressure sensor according to claim 1, wherein the pressure deflectable diaphragm end of the probe body comprises a distal end and wherein the probe body comprises a proximal end opposite the distal end, wherein an intermediate circuit enclosure is disposed at the proximal end and wherein an intermediate circuit is disposed in the intermediate circuit enclosure, wherein the first and second portions of the capacitor define a capacitive sensor, with the intermediate circuit receiving a signal from the capacitive sensor.

16. The pressure sensor according to claim 15, further comprising a remote circuit enclosure and a main circuit disposed in the remote circuit enclosure, the remote circuit enclosure connected to the intermediate circuit enclosure by an interconnect, the intermediate circuit communicating with the main circuit through the interconnect.

17. The pressure sensor according to claim 16, wherein the intermediate circuit is disposed on a printed circuit board, and wherein a temperature sensor is disposed on the printed circuit board.

18. The pressure sensor according to claim 17, wherein the main circuit is configured to receive a temperature signal from the temperature sensor and wherein the main circuit is configured to produce an output signal that is compensated for the temperature of the intermediate electronics enclosure.

19. The pressure sensor according to claim 1, wherein the intermediate component comprises a material having a low coefficient of friction.

20. A pressure sensor, comprising:
a probe body;
a pressure deflectable diaphragm end formed of a conductive material and coupled to the probe body, the conductive material having a first coefficient of thermal expansion, the pressure deflectable diaphragm end having a first surface defining at least a first portion of a capacitor;
an alumina disk having a second coefficient of thermal expansion that is less than the first coefficient of thermal expansion, the disk including a metallization layer, with the metallization layer being spaced from the first surface such that the metallization layer at least partially defines a second portion of the capacitor;
a spring disposed between the probe body and the alumina disc, the spring biasing the alumina disk toward the pressure deflectable diaphragm end; and
an annular shim component disposed at a peripheral region of the alumina disk and isolating the alumina disk from the pressure deflectable diaphragm end, the annular shim being formed of a third material having a third coefficient of thermal expansion;
wherein the third coefficient of thermal expansion is less than the first coefficient of thermal expansion.

21. A pressure sensor comprising an intermediate circuit that produces an electrical voltage signal proportional to a difference between a reference capacitance and a sensed capacitance.

22. The pressure sensor according to claim 21, wherein the intermediate circuit comprises a diode bridge.

23. The pressure sensor according to claim 22, further comprising a probe assembly having a capacitive pressure sensor at a distal end, the capacitive pressure sensor capable of producing the sensed capacitance as a result of pressure acting on the capacitive pressure sensor.

24. The pressure sensor according to claim 23, wherein the probe assembly comprises a proximal end opposite the distal end, wherein an intermediate circuit enclosure is disposed at the proximal end and wherein the intermediate circuit is disposed in the intermediate circuit enclosure.

25. The pressure sensor according to claim 24, further comprising a remote circuit enclosure and a main circuit disposed in the remote circuit enclosure, the remote circuit enclosure connected to the intermediate circuit enclosure by an interconnect, the intermediate circuit communicating with the main electrical circuit through the interconnect.

26. The pressure sensor according to claim 25, wherein the intermediate circuit transmits the electrical voltage signal to the main circuit through the interconnect.

27. The pressure sensor according to claim 21, wherein the intermediate circuit is configured to operate continuously at temperatures exceeding approximately 125° C.

28. The pressure sensor according to claim 27, wherein the intermediate circuit is configured to operate continuously at temperatures of approximately 150° C.

29. The pressure sensor according to claim 21, wherein the electrical voltage signal is a DC signal.

30. The pressure sensor according to claim 25, wherein a distance between the intermediate circuit enclosure and the remote circuit enclosure is at least double a distance between the intermediate circuit enclosure and the distal end of the probe assembly.

31. The pressure sensor according to claim 25, wherein a distance between the intermediate circuit enclosure and the remote circuit enclosure is at least quadruple a distance between the intermediate electronics enclosure and the distal end of the probe assembly.

32. The pressure sensor according to claim 25, wherein the probe assembly includes a relatively rigid body extending between the intermediate circuit enclosure and the distal end and wherein the interconnect is relatively flexible.

33. The pressure sensor according to claim 25, further comprising a temperature sensor configured to sense a temperature indicative of the intermediate circuit enclosure.

34. The pressure sensor according to claim 33, wherein the intermediate circuit is disposed on a printed circuit board, and wherein the temperature sensor is disposed on the printed circuit board.

35. The pressure sensor according to claim 33, wherein the main circuit is configured to receive a temperature signal from the temperature sensor and wherein the main circuit is configured to produce an output signal that is compensated for a temperature of the intermediate circuit enclosure.

36. A pressure sensor comprising:
a probe assembly including:
  a relatively rigid body;
  a distal end having a capacitive pressure sensor, the capacitive pressure sensor capable of producing a sensed capacitance as a result of pressure acting on the capacitive pressure sensor; and
  a proximal end opposite the distal end;
an intermediate circuit enclosure disposed at the proximal end;
a capacitive detection bridge circuit housed within the intermediate circuit enclosure, the capacitive detection bridge circuit producing an electrical voltage signal proportional to a difference between a reference capacitance and the sensed capacitive signal;
a remote circuit enclosure;
a relatively flexible interconnect coupling the remote circuit enclosure to the intermediate circuit enclosure; and
a main circuit disposed in the remote circuit enclosure, the remote circuit enclosure connected to the intermediate circuit enclosure by the relatively flexible interconnect, the capacitive detection bridge circuit transmitting the electrical voltage signal to the main electrical circuit through the interconnect.

* * * * *